United States Patent [19]
Chew

[11] Patent Number: 5,901,303
[45] Date of Patent: May 4, 1999

[54] SMART CARDS, SYSTEMS USING SMART CARDS AND METHODS OF OPERATING SAID CARDS IN SYSTEMS

[75] Inventor: Gary Chew, Singapore, Singapore

[73] Assignee: Gemplus Card International, Gemenos, France

[21] Appl. No.: 08/773,190

[22] Filed: Dec. 27, 1996

[51] Int. Cl.[6] .................................................. G06F 12/14
[52] U.S. Cl. ......................................... 395/400; 235/492
[58] Field of Search .............................. 395/400; 235/492

[56] References Cited

U.S. PATENT DOCUMENTS

5,206,938   4/1993   Fujioka ................................. 395/400

Primary Examiner—Harold I. Pitts
Attorney, Agent, or Firm—Roland Plottel

[57] ABSTRACT

A smart card has a repository having a first data element and a value added function. The card further has an operating system having a data element access function for sequencing to said repository and a microprocessor for executing said data element and said value added function in accordance with said access function.

13 Claims, 7 Drawing Sheets

SMART CARDS, SYSTEMS USING SMART CARDS AND METHODS OF OPERATING SAID CARDS IN SYSTEMS

FIELD OF THE INVENTION

The invention relates generally to integrated circuit cards, and more particularly to improved cards, systems using said cards and methods of operating such cards and systems

BACKGROUND OF THE INVENTION

An integrated circuit card is often defined as an International Standards Organization, ISO, standard card with an embedded circuit chip. The IC card may have a microprocessor, in which case it is sometimes termed a smart card. An advantage of integrated circuit cards is that the data in the card is usually quite secure, i.e. the data cannot be easily read out or changed by an unauthorized user. The security is much greater than with magnetic cards or optical track cards The security, light weight of the card (the card is typically the size of a conventional credit card), ability to hold data and perform a variety of applications has made the cards increasingly; about 1 million new cards are put into service each day.

The smart card is often referred to as the invention about 25 years ago of a Frenchman, Roland Moreno, U.S. Pat. No. 3,971,916. An introductory text on smart cards and their applications may be found in Ayer, Kenneth R. and Schuler, Joseph F., Smart Card Primer, 1994, Minneapolis, Minnesota, The Schuler Consultancy.

Integrated circuit cards are usually the size of a conventional credit card, with six or eight small electrical contacts on one face. The newer type of card is of the "contactless" type, i.e the contacts are not electromechanical and there is no physical contact. There is a small loop or antenna inside the card, which makes electromagnetic or induction contact with a card reader or terminal. This type of card is shown for example in U.S. Pat. Nos. 4,874,934 and 5,206,495 presently owned by the same assignee as in this application. When the term "contacts" is used it includes both the electromechanical and electromagnetic contacts.

The mechanical and electrical specifications of the cards are standardized, and one set of standards is published by ANSI, American National Standards Institute, 11 East 42nd Street, New York, NY 10036 under the title "Identification cards-Integrated circuits cards with contacts" ISO 7816-1 and ISO 7816-2. Such cards are manufactured by and are commercially available from several companies, including applicant's assignee, Gemplus Card International, avenue du Pic de Bertagne, Parc d'Activites de la Plaine de Jouques, 13420, Gemenos, France.

Proposed higher numbered parts to ISO 7816 deal with electrical signals and transmission protocols, interindustry commands for interchange numbering systems and registration procedure for application identifiers, interindustry data elements, etc. Certain applications of the card, e.g. in mobile telephones, and in financial transactions have their own standards. Telecommunication standards are defined by GSN, and financial transaction cards have proposed standards in ISO 9992 and 10202. There are sets of European standards from the European Telecommunication Standards Institute ETSI and the European Committee for Banking Standards ECBS, as well as the Commite Europeene de Normalisation CEDN.

In most countries, the ISO physical and electrical card size standards are used. The application standards are semi-standardized, and may have variations among providers of the goods or services. E.g., one group of banks may have one standard or convention for use of bank cards, while another group of banks might have a slightly different one. But these modifications are add ons to the various standardized applications, whether mobile telephone on the GSM, or electronic purse on EMV, or pay TV, etc. Each standard, must be rigidly adhered to by all systems operators, all terminals, and cards used in these applications It becomes difficult to add value to these standardized protocols, as the agreed to protocols must not be changed.

The term "transaction" is defined to mean any type of interchange between the smart card and a remote processing system (computer system). The interchange could be on-line or off-line depending on the application and security architecture of the interchange The access point is the point of service for the smart card. This could be an intelligent device with a smart card reader and communication capabilities The development of microprocessor based smart card operating systems to date has been driven and limited by smart card international standards and specifications (for example ISO-IEC 7618, ETSI TE9 and EMV). The specifications define the functions or commands that the operating system should have in order to support the application segment to which it caters (e.g. the ISO-IEC 7816-4 defines commands for a general purpose operating system, or the EMV specifications, which define commands for a payment card). These operating systems usually provide a subset of standardized commands as well as commands proprietary to the smart card supplier. These commands normally provide smart card administrative commands as well as commands that add value to the operating system Administrative commands are needed to help manage the smart card life cycle. Value added commands allow solution providers to innovate and build new applications using the smart card, e.g. the payment based MPCOS card is often used in identification based applications. Traditional smart card operating systems are conservative in nature. They are small, and the number of value added functions is few. This is due in part to the long cycle time needed to mask an operating system into the smart card ROM. To allow modifications to these operating systems, software hooks for filters are normally provided by the operating system. A filter is a small piece of software code that is loaded into the smart card nonvolatile memory in the early stage of its life cycle. The filter extends the functionality of the operating system as it allows new commands to be accepted by the operating system. These commands are intercepted by the operating system and passed to the filter code to be executed. The process of developing and loading the filter requires intimate knowledge of the operating system and chip internals. The information needed to perform this task is usually confidential in nature. A filter may also permit looking into the internals of the operating system, thus, the loading and execution process is usually protected by cryptographic means.

With the increased use of smart cards and standard applications (for example GSM, EMV), more and more card issuers are looking towards value added functions to be added to a standard operating system. The filter type of process becomes ineffective, as it is too cumbersome. Coupled to this, there is an increased demand for more and more complex smart card acceptor devices, e.g. GSM handphones, or point of sales terminals, which are expected to accept and interact with a set of standard applications as well as the value added application,. the latter being inserted by the card issuer or acceptor device owner.

An aspect of the present invention is to permit easy addition of added value programs to the standardized application with no change to the accepted standards, and minimal or no change to the readers and central offices operating on the standard.

In operation, a card is inserted into a reader, also called terminal, interface device, or access point. Remote from the reader is a computer system, which performs the accounting, tracking of the cards and use of the cards, the goods and services provided by the cards, and supervision of the transactions between the cards and the readers. In the GSM telephone system, the remote computer is a telephone switch, which handles the call in addition to the payments for the calls, which are tied to the IC-cards.

It might be helpful to have a specific example for the present invention.

A multifunction smart card is one that can be used in two different applications, e.g. a pre-paid telephone card to make calls from a public telephone booth equipped with a reader; and an electronic "purse", to pay for purchases from self-service vending machines, such as gasoline from a gasoline pump, or candy from a vending machine.

In addition to the application transaction, it is desirable to permit the system to give added value to the card user when goods or services are purchased. For example, frequent flier miles might be given for each dollar of gasoline purchased, or points could be given for the purchase of a certain number of candy bars. The points would then be redeemable for a prize, e.g., an extra candy.

At the present time, when added value is to be given to a transaction, that added value is calculated in the reader or in the remote system and then transferred to the card. This has a number of disadvantages First, there is a security risk in transferring data between the card and the reader, and between the reader and the central computer. Encryption is used, but it adds to the complexity and cost of the overall operation The reader must be updated to provide the added value, e.g. points, or frequent flyer miles, which awards may change from time to time, and which may vary from card user to card user, thus potentially presenting a very complex reader calculation or central office calculation As goods and services are dispensed from a stand-alone gas pump or vending machine, without a real time link to a central computer, the calculation and the updating of the added value is moved to the vending machine to administer.

OBJECTS OF THE INVENTION

An object of the invention is to avoid the shortcomings of the prior art, and to facilitate the provision of value added features to smart cards, and to systems using smart cards.

Another object of the invention is to reduce card/reader interface complexity

A further object of the invention is to increase functionality of existing smart card applications with minimal changes in the readers A further object of the invention is to allow application designers to easily add value in standard smart card based architecture, e.g. mobile telephone, GSM, electronic purse, EMV, pay TV, etc.

Another object of the invention, in a multifunction card, is to permit value added functions to be attached to one or more than one of the card applications

SUMMARY OF THE INVENTION

According to an aspect of the invention, there is provided a smart card with an elementary file having a first data element and a value added function; an operating system having a data element access function for sequencing to the elementary file, and a microprocessor for executing the data element and the value added function in accordance with the access function.

Another aspect is a method of programming and operating a smart card having added value functions In the method a data element is entered into card memory; the operating system in the card is set to access the data element; a value added function is linked to the card memory; and the value added function is linked to the data element so that the value added function is performed with the data element Further details of entering linking and operating are then defined Another aspect is a smart card with a plurality of data elements in memory, a plurality of functions in memory, means for assigning one of the data elements as active, means for associating one of the functions with the active data element, so that the one function is seamlessly executed with active data element when the active data element is accessed The card has an input for receiving an external signal from outside the card to execute the one data element, and an operating system, which in response to the external signal coming from outside the card to execute one of the elements, commands an execution of the active data element, and thereby seamlessly also executes the added value function.

An aspect of the invention is a method for the use of ASSIGN and ASSOCIATE commands in a smart card to provide transparent transaction with seamless execution of an added value function with a highly standardized application.

The above and further advantages of the invention may be better understood by referring to the following description, with the accompanying drawings.

DETAILED DESCRIPTION OF THE PREFERRED EMBODIMENTS

Figure 1:
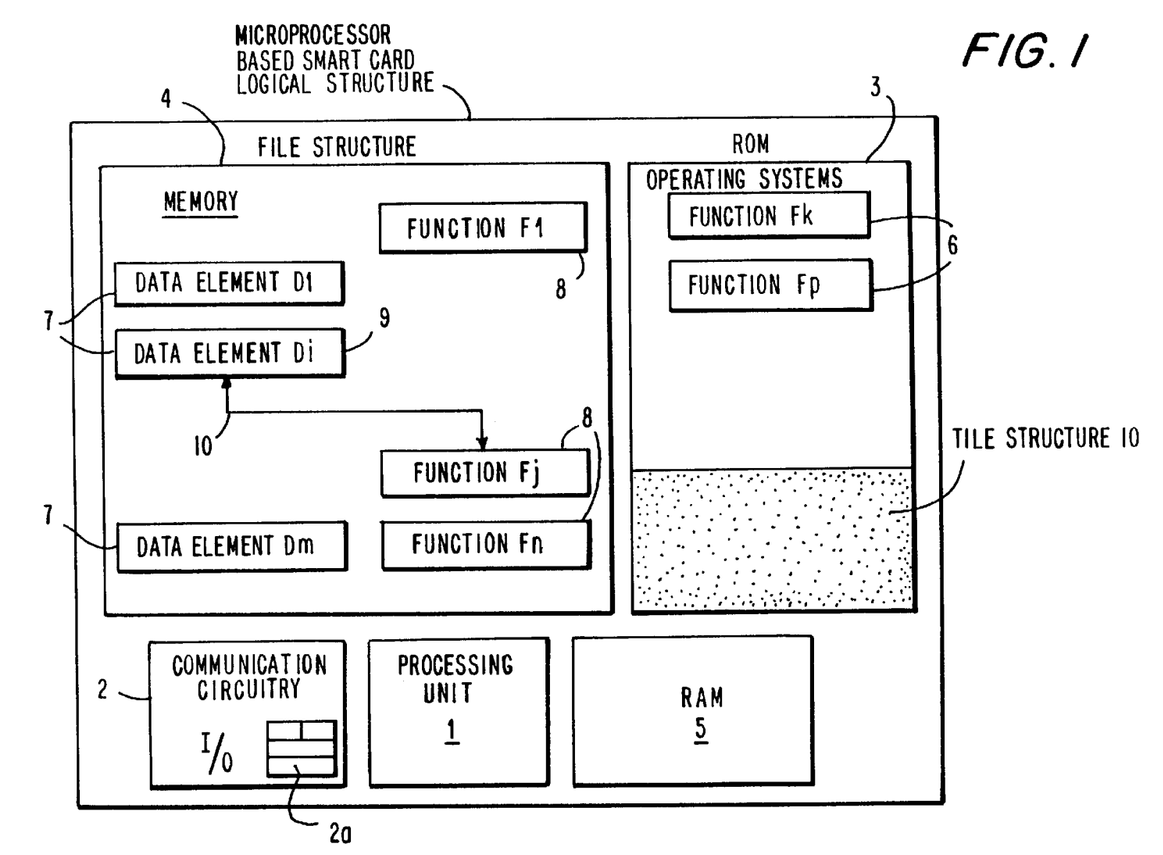
FIG. 1 is a schematic block diagram of part of a smart card structure

FIG. 1 shows a smart card having a processing unit 1, and communications circuitry and input-output contacts 2a. The card, has an operating system 3, usually ROM, a programmable memory 4, and a random access memory RAM for calculation 5. The operating system 3 manages the smart card as well as performs the application specific functions 6. The programmable memory is organized with a smart card that includes dedicated files and elementary files, and contains data elements 7 shown here with the legend Dl . . . Di . . . Dm. The data elements are stored in the elementary files. The elementary files may also contain processing instruction in code 8. In the more advanced multiapplication cards, the invention assigns specific data elements as active 9, and then associates an active data element with certain processing capabilities or added value functions. These are coordinated from the operating system 3. The operating system causes the associated value added function to be executed when the active data element is accessed. The value added function may be from the EF or may be from the OS itself. By linking the added value function to the data element, the added value function is performed in the card, while previously the added value function was performed in the reader or remote processing system, and then the results of that added value function were stored in the card. It should be noted that calculations performed within the card are much more secure from tampering, than when the function is calculated in the reader and transferred to the card.

Figure 2:
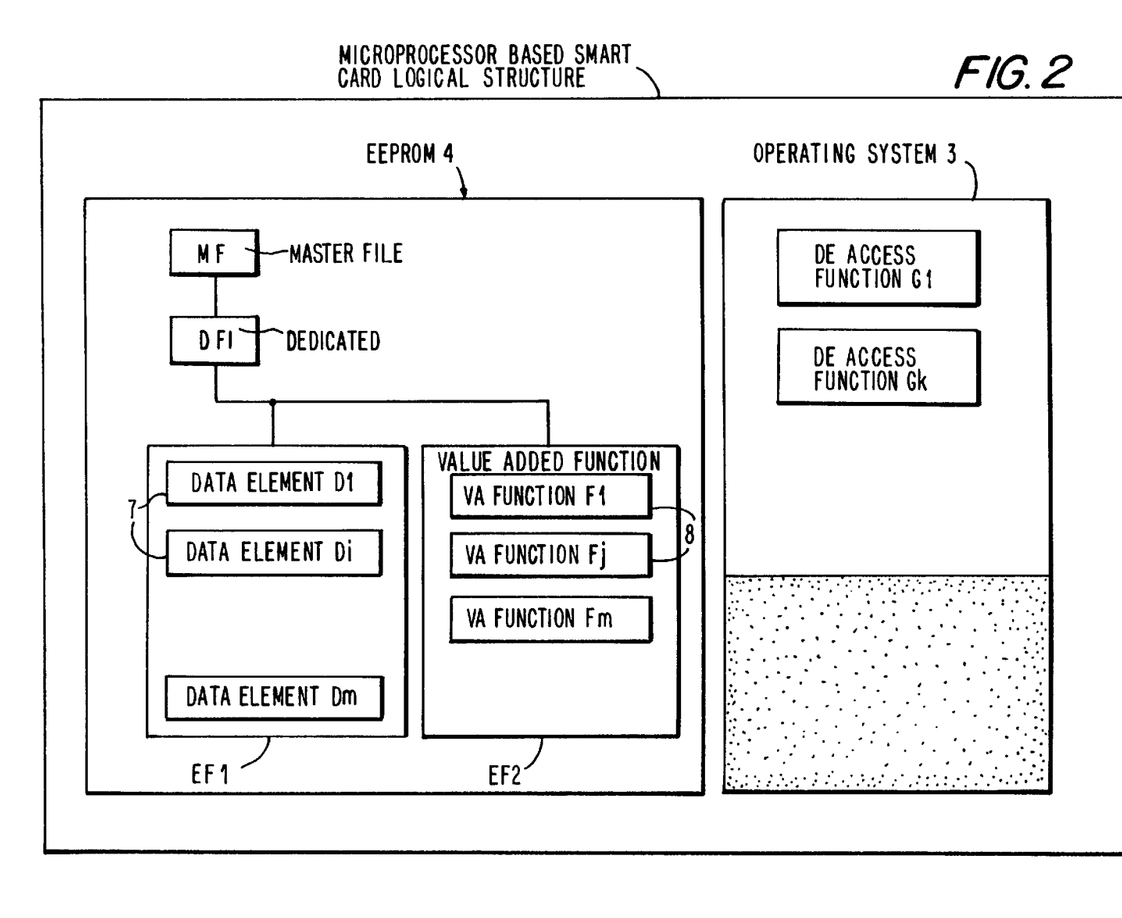
FIG. 2 is a further schematic block diagram of part of a smart card logical structure.

FIG. 2 is a logical block diagram showing the data elements 7 in a file structure in a elementary file EF1. The added value functions 8 are stored in another elementary file EF2. Data element access functions Gl . . . Gk, are in the operating system 3. The card operating system and file structure of FIG. 2 has a master file MF and dedicated files, one of which DF1 is shown The master file MF is the root of the file structure In the example the dedicated file that is of interest is DF1 Under this data file DF1, data elements are defined. The elements are stored in the elementary file EF1 and EF2. In this application, let the elementary file that is of interest be EF1, and some added value functions of interest Fl . . . Fj . . . Fn, are stored in the elementary files EF2. Data element access functions, i.e. the access to the data elements are basic functions, and are defined in the operating system as shown in FIG. 2, and are listed as Gl . . . Gk.

In the example, on the purchase of gas, a value added function would award points when gasoline is purchased using the card. The data element Di would correspond to a charge in a credit card system, or a debit equal in amount to the gasoline purchased in a prepaid card system. The value added function Fj would correspond to the calculation and storage of a certain number of points (or frequent flier miles) corresponding to the gas bought. The card is to perform the value added function in a transparent manner, i.e. so that the terminal does not know that the points are being calculated and awarded. It is done entirely in the card.

Figure 3:
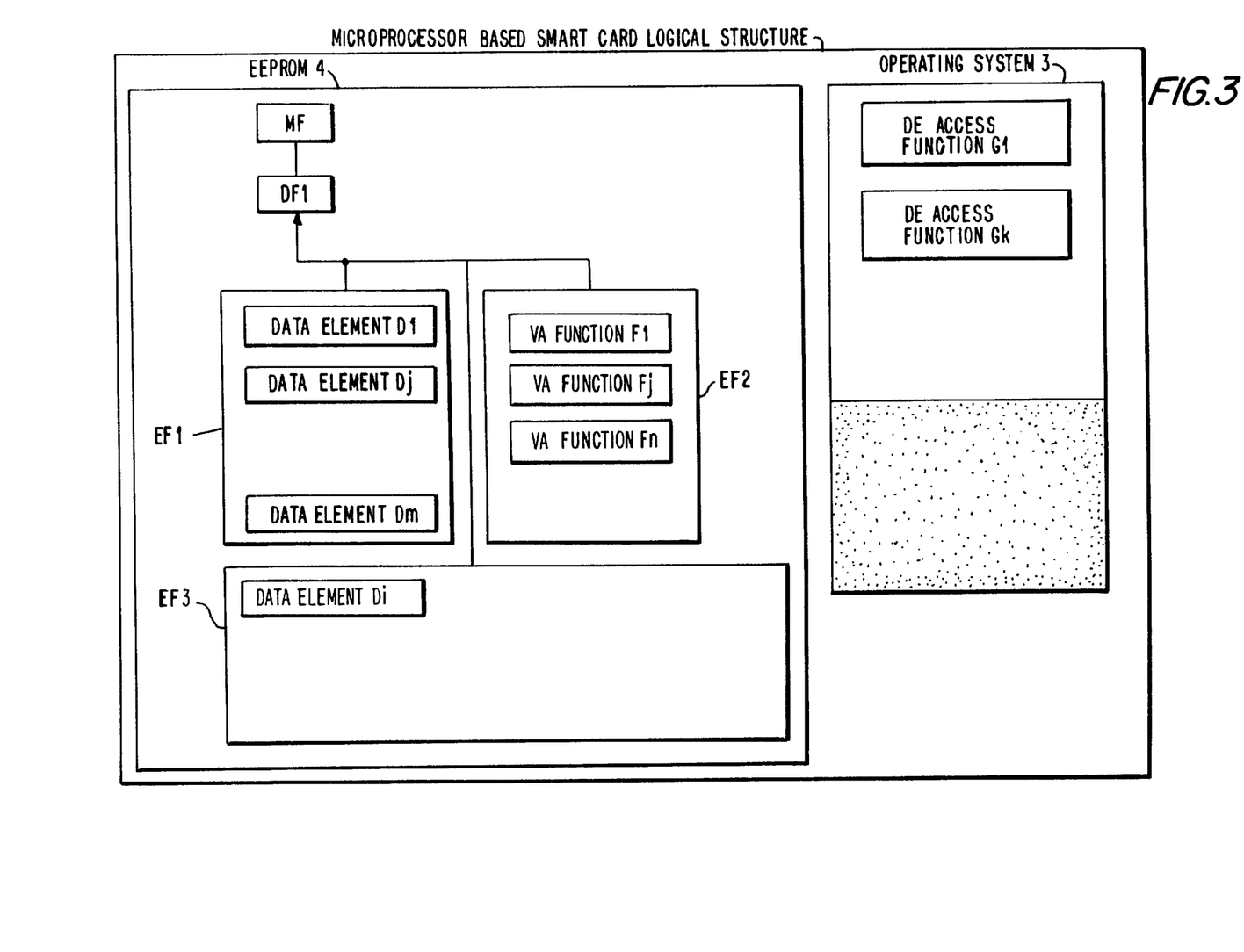
FIGS. 3 and 4 are variations of the smart card structure at different stages of organizing data in accordance with one embodiment of the invention

In order to do this, the data element (e.g. purchase gas, Di) which is to trigger the value added function is an "active" data element. In the example the chosen element is Di stored in EP1. A command to perform the assignment of data element Di may be ASSIGN. On the command (ASSIGN, Di) Di's identity is copied into a repository This is shown in FIG. 3 where an additional repository EF3 has been set up and contains the data element Di.

Figure 4:
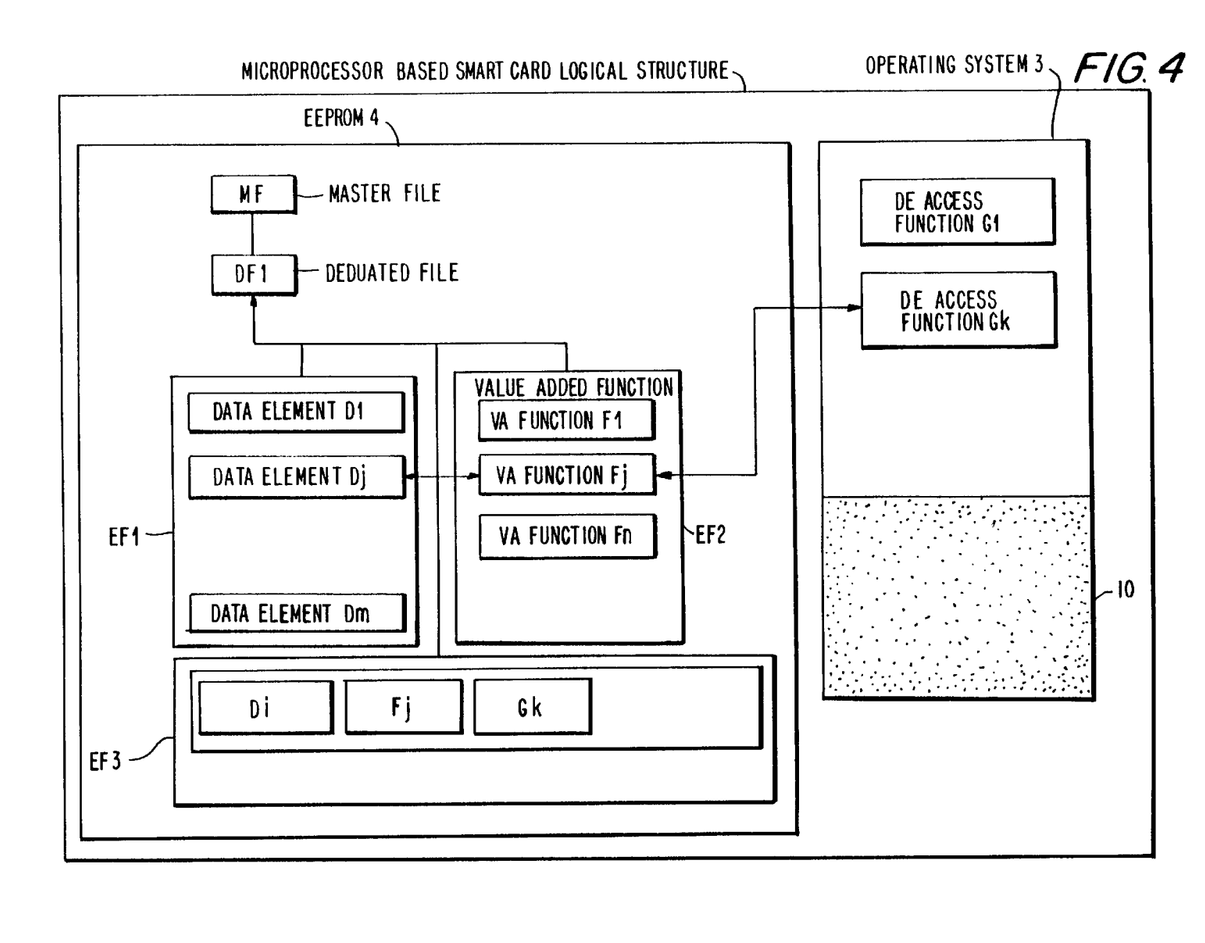

Let the value added function (e.g. calculate and store points) that is to be executed when Di is accessed be Fj. When the command ASSOCIATE 1 (Di, Fj) is given, Fj's identity is copied to the repository in the same record as Di, i.e. to repository EF3 as shown in FIG. 4. Next, let the data element access function in the operating system that will cause Di to be executed be called Gk. Let the command to perform the second association between the data element and the access function be ASSOCIATE 2. When the command ASSOCIATE 2 (Di, Gk) is called to associate Di to Gk in this embodiment, Gk's identity is also copied to the repository in the same record as Di and Fj. The commands ASSOCIATE 1 and ASSOCIATE 2 could have been performed in a single step by a composite command ASSOCIATE that performed the 2 tasks together. At this stage the smart card is ready to perform transparent transaction processing This is also shown in FIG. 4.

When, in the example, the gas is being pumped and paid for, the data element Di and the added value function Fj are executed by the smart card operating system The application transaction flow been designated so that the sending of the command Gk references Di to the smart card. The reader may or may not have knowledge of the association between the data element Di and the value added function Fj, or the access function Gk. Once the command Gk is sent, and executed by the smart card operating system, Di and the added value function Fj will be executed Hence, the performing of the added value function is a transparent transaction proceeding without knowledge of the reader.

Figure 5:
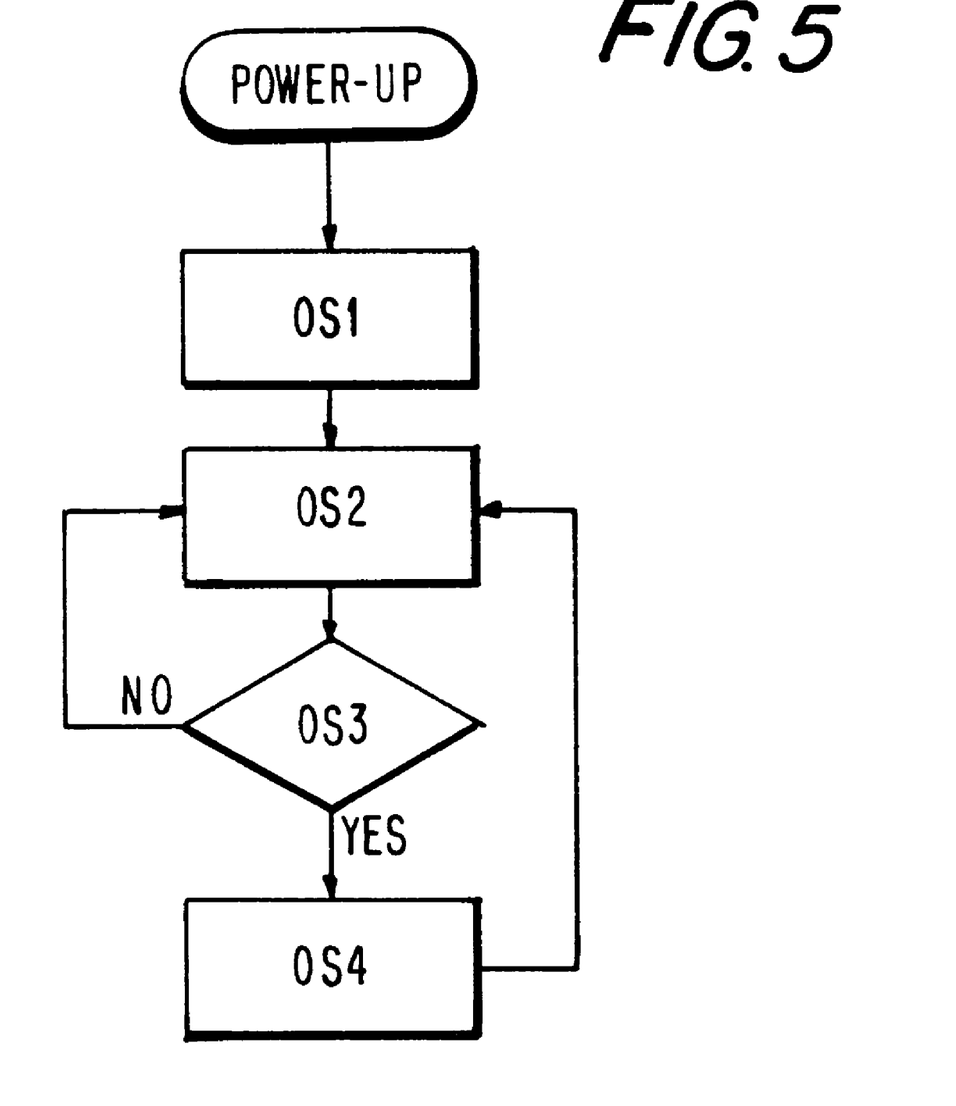
FIG. 5 is a flow chart showing a typical smart card operating structure of the prior art.

The smart card operating system, as shown in FIG. 5 accommodates the value added function and performs it transparently FIG. 5 shows a flow chart of a prior art smart card operating system The card responds to power, i.e. inserted into a reader, with a well defined start-up sequence frequently called an "answer-to-reset". This is shown as block OS1 After answer-to-reset, the operating system waits for a command from the reader, and this is shown in block OS2. When a response is received, the operating system parses the commands and checks in its function look-up table to see if it is a valid command. This is shown in OS3. If it is not a valid command, an error status is returned, and the operating system returns to block OS2. An example of a return signal would be using a prepaid card in a vending machine which does not accept that form of payment; or using a German telephone card in a French telephone booth. If the command is valid, e.g. the card is acceptable for this application, then the transaction proceeds. This is shown as OS4. After the transaction is completed, the operating system then returns to OS2. If the card is a multifunction card, there might be several branches extending down between OS2 to several OS3 and for each OS3 decision, there would be a corresponding OS4. Each of the commands will invoke common utility functions as buffer management, data checking, cryptographic functions stored in the operating system code, etc.

Figure 6:
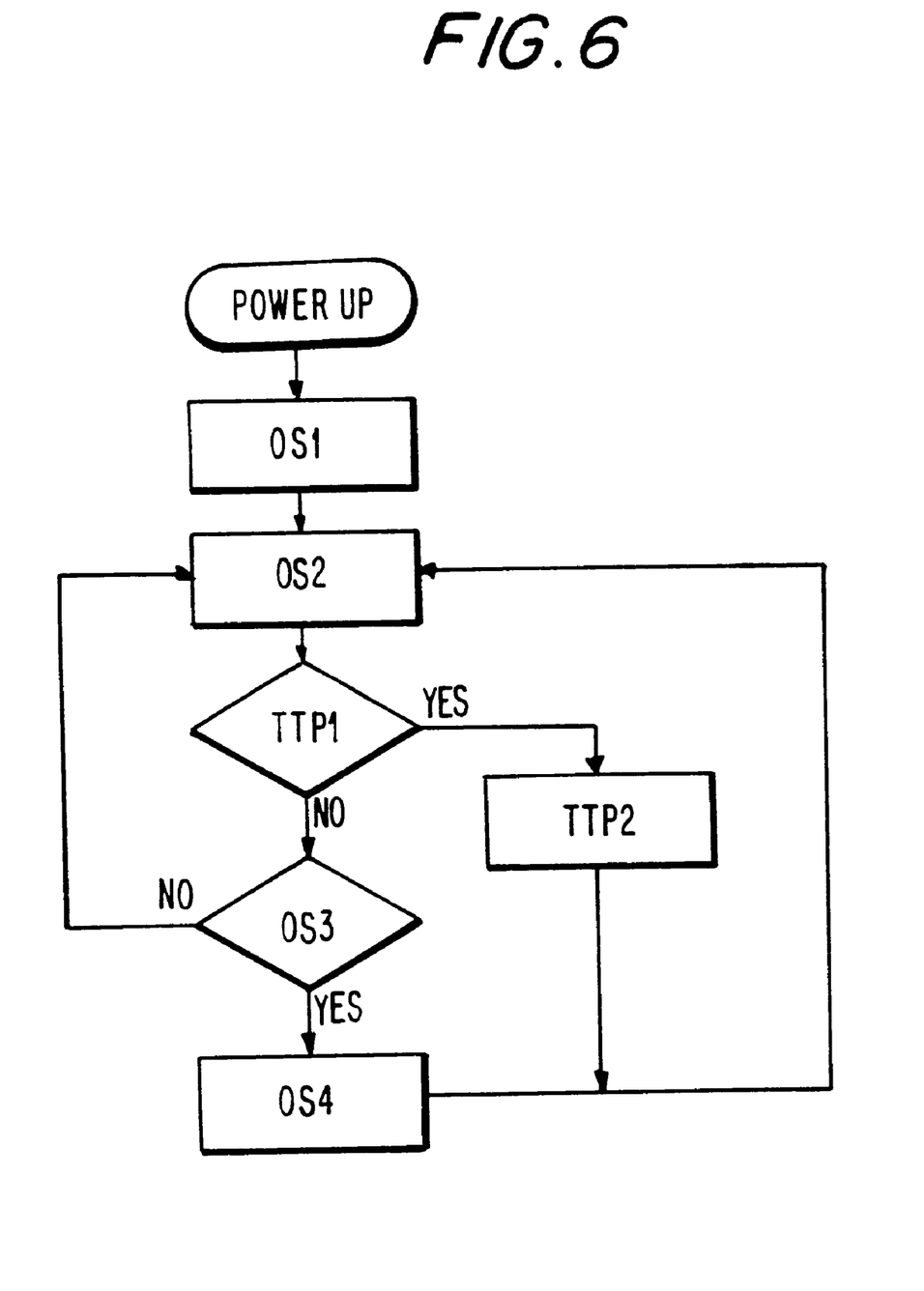
FIG. 6 is a flow chart showing operation of a smart card according to the invention.

FIG. 6 shows a modified operating system with one aspect of the invention. Here, in FIG. 6, elements which are common to FIG. 6 bear the same legend. The power up sequence remains the same. The block OS2 remains the same. When a command is received, the operating system now parses it, checks first in its repository for several things. If the command is an access function, accessing an active data element, as shown in decision box TTP1, then the operating system proceeds to block TTP2. If the decision is negative, then the operating system proceeds to the original decision tree OS3 and proceeds as before. If the block TTP2 is activated, the data element Di and the associated added value function Fj the repository EF3 is executed. After execution the operating system returns to OS2.

The implementation of the decision in TTP1, for example, might forward the instruction to location of data element Di in the field 7 and when a data element is made active, a flag is set with a new address of Di in repository EF3. Alternatively, the operating system would look first at a location in repository EF3 where it might expect to find data element Di, if it is an active element. That location, if not an active element, might say "return to the operating system", so that the next step would be to go to data element Di in the elementary file EF1 As shown in FIG. 6, when a file is made an active file, the embodiment is to go from the operating system step OS2 to that active file branch as shown by TTP1.

In the present embodiment, the data element Di and the value added function Fj have been placed in a separate repository EF3. The data element Dl might be erased to save space in the memory, and the file reallocated. The value added function might also be erased, and the space reallocated, or might be saved for use with other data elements, i.e. different applications. An alternative would be to include addresses at the end of the data element Di and at the end of the value added function, leaving those two programs in their respective elementary files, EF1 and EF2. It should be noted that in FIGS. 2, 3 and 4, the data elements and the value added functions are shown in separate elementary files, but this is for convenience, and they may be arranged in any convenient or conventional matter within the memory. In foreseeable developments of smart card operating systems, the data elements coudl even be fileds of a database table or member elements of software objects Additionally, throughout the system, the operating system is shown in ROM. Some of the access functions, Gl . . . Gk may be stored in ROM, or in EEPROM. The choice as to what type of memory, ROM, EPROM, or EEPROM, depends to a large extent upon the volume of cards to be made for each application, and for each added value function For small runs, EPROM or EEPROM is presently more desirable For very large runs, ROM is preferred The value added functions Fl . . . Fj . . . Fn may be entirely or partially entered into the card at the time of manufacture and shipment from the card manufacturing company, or may be added by the system's operator at the time of initializing the card and shipping it to the user. Alternatively, if the card needs to be verified or entered into the system, and the PIN number entered, etch, some or all of the added value functions might be entered at that time During the life of the card, the added value functions might be changed, added to, or removed, depending on the added value program that is currently of interest, e.g. additional bonus points might be given for a period of time when there is low usage of the underlying product to stimulate additional use of that product, or in certain geographical areas, e.g. at certain gas pumps, additional frequent flyer miles might be given to encourage sales of a new product coming into that area.

Let us look now at a practical use of the present invention. This example illustrates a design cycle and how the invention can bring about added benefits, not only to the card user, but to the overall system, and the system operator. Consider a provider of goods or services, e.g. selling gasoline against a prepaid smart card. The smart card user inserts his card into a reader on the gasoline pump. The card is verified, and thereafter a certain amount of gasoline is transferred to the card user's automobile. As the gas is being metered out, the value of the gas is subtracted from the card, a record is kept at the pump, and later transmitted to a central office, and the filling station gets money for the gas delivered. Suppose the filling station or the gasoline company wants to start a loyalty program in which card user who uses this brand of gasoline, and/or this particular station receives a bonus point or frequent flier mile for each quantity of gasoline purchased. The gasoline bonus point or frequent flier miles are based, in this example upon three variables, the amount of gasoline purchased $X, the type of account, and the salary of the card user. Thus, every time the card user makes a purchase of $X, he is awarded Y points based on a formula: Y (points)=F ($X, account type, salary). Prior to applicant's invention, the calculation of the Y points was conducted in the reader on the pump. If the pump was a stand alone pump not connected in real time to a central computer, then the program for performing the calculation was stored in the reader or in the pump. If on line, the calculation might be performed at a central computer. The typical sequence of steps include the following.

The supplier of the smart card to the customer would define the requirements of the value added program, and each smart card would contain the user's profile, e.g. account type, salary, and other information, and a counter for points.

The manufacturer of the reader, or other party would modify the reader at the pump to produce an application set around the added value function. When the card was inserted, the following steps would typically be:

Reset card

Read application data

Do cross authentication

Based on the $X transaction, calculate Y(points)=F($X account type, salary)

Increase the counter by Y

Update log file, etc. . . .

In an implementation according to the example of the invention, the following steps would be performed.

The provider of the card would do an initialization, including mapping based upon the requirements.

The smart card would contain the user's profile (account type, salary, etc.) and a counter for points.

A function Fj is designated that will calculated Y(points)= F($X, account type, salary); and which will increase the counter by Y.

The function is associated with data element Di.

The reader in the pump does not have to be changed or modified to provide the loyalty program, and performs the functions of:

Reset card

Read application data

Do cross on authentication

Perform update $X

Update log file, etc. . . .

The first benefit is that the complexity of the application is transferred from the terminal to the smart card. If the profile of the customer, and the variables on which the points are to be awarded, is complex, the terminal application has to contain many conditions and much calculation. For example, if different amounts of points are to be awarded on different types of accounts, and salary, e.g. type 1 and salary <X, then do this.

If account type=type 2 and salary <Y, then do that.

Or, if the account type=3 and salary <XYZ, then do something else, etc. This can be transferred into the smart card when the condition checking and execution is done. Better still, classes of functions can be created so that card with, let us say, account type 1, will be loaded with function 1, and given to a card holder who is an account type 1 similarly, cards with account type 2 will be loaded with function 2, and given to card holders with account type 2, etc.

After the application is launched and the environment changes, changes to the value added program may need to be done. If the calculation is done in the reader/terminal, it is often difficult to change the formulas inside the terminal. What is required as times change and new programs are installed is to issue new cards with additional data elements; importantly the same terminals, e.g. pumps, are unchanged and can be used unchanged. Also, in areas where the terminals are spread over a very large geographic area, persons might travel to areas where the added value is not in the pump readers, so that it becomes important to have the program entered into the cards.

For example, let us say that the oil company now wants to include a fourth variable into the card for calculating points, and that a new function is needed to take this into account, e.g. Y points=G ($X, account type, salary, and status (new)). The new cards can work with the pump terminals, without changes to the terminals, and this implement the new application with the new cards. Better still, if the cards are of the type which can load in new functions dynamically, i.e. remote update, then the new application can be introduced in the field into existing cards, and provide users with the benefits straight away. The dynamically loading of new functions could be performed either at selected pumps, or in the event of a multifunction card, which works off an ATM, as most pre-payment cards do, then at the ATM machine. Also, the old card, unchanged, would still work, i.e. calculate points until updated.

Figure 7:
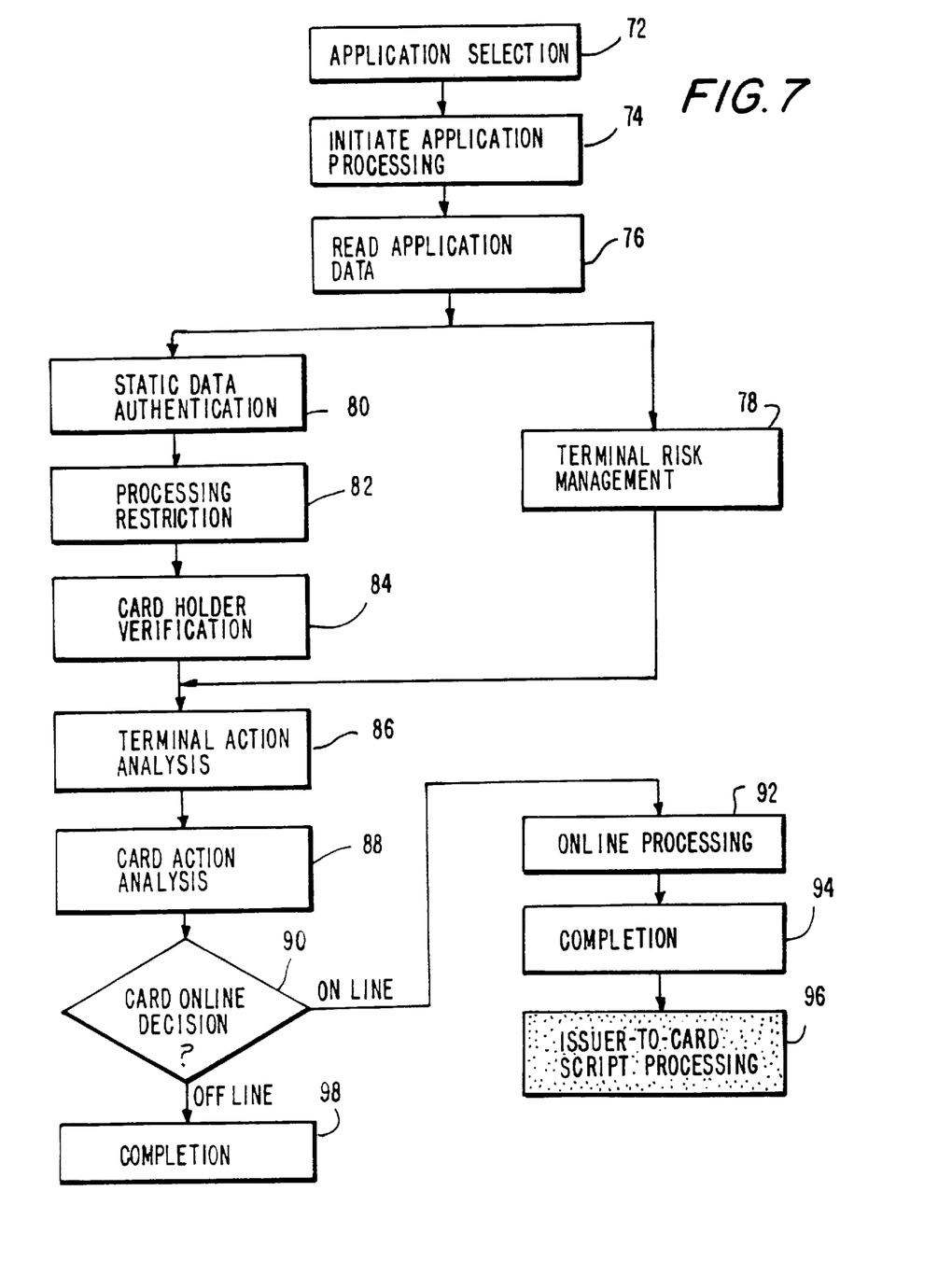
FIG. 7 is a block diagram illustrating another application

As a further illustration consider the use of the invention as a system where script processing is supported (for example GSM Phas 2 with ESMS or EMV version 2 qand above terminal requirements) This is especially important as it allows 'globalization' of applications. The EMV processing is shown in FIG. 7. Here, there is an application selection 72 to initiate application processing 74, and a read application data 76. There is a branch to terminal risk management shown in block 78. Another branch is to a static data authentication 80, followed by a processing restriction 82, and a card holder verification 84. The two branches merge at a terminal action analysis 86, followed by a card action analysis 88. A card on line decision is then made at 90. If on line, the process proceeds to an on line processing 92. This processing is then completed 94, and followed by an issuer-to-card script processing 96. Going back to the card on line decision 90, if it is to be done off line, then the completion is done as shown in box 98.

In a prior art system, only terminals acquired by the customer can perform the whole transaction Suppose that now we are in the EMV environment and that terminals in that environment support script processing (compulsory in EMV2.0 and VIS). The processing flow is shown in FIG. 7. Note that in the EMV context the card can be configured so that on line processing is performed periodically During the script processing, the issuer host, issues commands to the card through the terminal Using the example above the command: Update (ZZ,$X) will cause the application to be executed without the terminal being aware of it.

The functions or commands to create active data elements Di and/or tags to designate a data element as active and/or privileged locations in the smart card to store the active data elements would all be protected by access security functions.

Similarly, the functions or commands to load the value added functions into the smart card file structure or memory and the locations of those functions would also be protected by access security functions.

Functions or commands to associate the value added function to the active data elements and/or privilege locations in the smart card memory to show this association would also be protected by access conditions.

Functions and locations of functions of the basic operating system could also be designated as value added functions to make use of the transparent processing ability.

Additionally, functions or commands to associate the normal access functions to active data elements, and/or privilege locations in the smart card memory to show this location The association also reflects the security requirements needed to execute the access function.

Further, functions in the operating system that will allow the value added function to execute when the active data elements are accessed by the associated access functions and the security requirements have been satisfied Functions in the operating system that will provide the results and/or proof of execution of a value added function, are protected by access conditions and/or cryptographic certificates The access conditions use pass words or PINs or encrypted passwords, encrypted PINS, or cryptographic certificates. Preferably, the encryption used is the DES (data encryption standard algorithm), or triple-DES, or RSA algorithm. Preferably, the cryptographic certificates are generated using the DES algorithm or the triple-DES or RSA algorithm with a standard hashing/function SHA or MDS, or a signature algorithm like DSA or SCHNORR signature. The smart card file structure for example may be a subset of the ISO-IEC standard 7816-4 file structure. The data elements may be tagged using ISO-JEC standard 7816-6. In the future the data elements could be identified as a field of a database table in the card or a member element of a class object.

The ASSIGN instruction typically takes a file, e.g. file Di, from memory and moves it to RAM for execution. The ASSIGN instruction typically takes a data element e.g. Di, from its location and copies it or its reference in the system into a repository that is typically a file. The ASSOCIATE instruction typically takes a function e.g. Fj from its reference in the system and copies it into the same repository linking it to the Di reference. In the present example, the data element Di would be associated with the added value Fj.

As a variation, several value added functions may be stored in memory during the card initialization by the issuer, for example, Fi, Fj and Fk. In this case, new value added functions can be activated when the needs arise without on-line loading.

For an example of how these instructions work consider an IC payment or purse card, which is a multifunction card. Part of its functions include its ability to be used at three different gas stations, Exxon, Texaco and Shell.

Assume that all three gas stations accept payment from an electronic purse card, i.e. money or value is stored in the card electronically, and removed as the gas is pumped. The Exxon station gives bonus points. The Texaco station does not give bonus points. The third station, Shell gives a different type of bonus points. The cards are purchased by drivers, or persons wishing to purchase gas. Loading of money to the card is done through a conventional procedure i.e. on line to the card issuer after guarantee payment has been performed. It is assumed that pumps have been installed with the purse debiting program. It is also assumed that for Exxon pumps a field B1 is assigned to hold bonus points and that a function Update(D1,Data) will be executed during the course of the transaction. Likewise the Shell pumps the field B2 and a function Update(D3,Data). It is assumed that Exxon will have a bonus award function F1 worked out with the card issuer, Shell F2 and Texaco has none worked out for the moment. F1 will update the bonus point field B1, and F2 B2.

When the card is first inserted to a card reader, for example, an Exxon pump, the card reader will perform an on-line dial-up to the card issuer. During the exchange between the card issuer system and the card, the card issuer host will first create the data element D1 and download the function F1 to the card's memory. Next the host will perform an ASSIGN of D1 and then an ASSOCIATE of D1 to F1. The ASSIGN D1 command will copy the D1 reference into the card repository and the ASSOCIATE D1 to F1 command will associate the value added function F1 to the data element D1. This function F1 will increment the field B1 in the card based on the amount of money or the amount of gas and other variable, e.g. the card holder's salary, or geographical, or whether he is a preferred customer or not. When a pump transaction takes place, money from the card is debited. The pump then issues the command Update(D1, data). At this point, the card operating system will sequence execution to the function F1. The bonus point field B1 will then be increased accordingly.

When the card is inserted into a Shell card reader for the first time, the same sequence of steps takes place. The card issuer host will create D2, download F2 to memory, ASSIGN D2 and ASSOCIATE D2 to F2. The function F2 will increment the field B2 in the card based on some other profile that Shell has worked out.

Since no application has been designed with Texaco, when the card is inserted into a Texaco card reader for the first time, no dial-up takes place. Supposing after some time, Texaco decides to start its own bonus program It shall design a bonus function F3. The dial-up sequence in the Texaco card reader is then activated. When the card is inserted into a Texaco card reader for the first time, the sequence of steps described above will then take place. The card issuer host will create D3 and download the function F3 to memory, then ASSIGN D3 and ASSOCIATE D3 to F3.

It should be noted that with the present arrangement, there will exist 3 different value added function associated to 3 different data elements for a card that is used in 3 different gasoline suppliers It is within the scope of the invention to allow the same value added function to be assigned to different data elements For example if Shell and Texaco have agreed to an identical award function F4, the card issuer would have performed ASSOCIATE D2 to F4 and ASSOCIATE D3 to F4 in the sequence described above.

It is also within the scope of the invention to change the value added functions for a particular supplier. Suppose that after some trial period, Exxon finds that its value added function F1 is not effective enough, and that a new function F5 will be able to perform better For new cards, the same sequence of steps takes place, except that the card issuer host will issue the command perform ASSOCIATE D1 to F5. For existing cards, the card issuer host can foe example during an on-line exchange for loading, load the new function F5 into the space occupied by the previous function F1 in the card.

What is claimed is:

1. A smart card comprising (a) an repository EF3 having a first data element (Di) and a value added function (Fj), (b) an operating system (3) having a data element access function (Gk) for sequencing to said repository EF3, and (c) a microprocessor (1) for executing said data element (Di) and said value added function (Fj) in accordance with said access function (Gk).

2. The card of claim 1, further comprising (d) a memory for storing repository EF3 stored therein, (e) another elementary file (EF1), having said data element (Di), (f) means to copy said data element (Di) from said other elementary file (EF1) to said repository EF3, and (g) means to copy and to link said value added function (Fj) to said repository EF3 whereby said value added function, and said elementary file are executed with one another.

3. A card according to claim 2, comprising an external input for receiving and storing instructions to perform said coping to said repository EF3.

4. A card according to claim 3, wherein at least part of said added value function (Fj) is added to the card via said external inputs and after said card has been manufactured.

5. The card according to claim 2, wherein said operating system first sequences (TTP1) said repository EF3, (TTP2), and then bypasses (TTP2→OS2) said other elementary file (EF1, OS4).

6. A method of programming and operating a smart card having added value functions comprising (a) entering a data element into card memory, (b) setting an operating system in said card to access said data element, (c) adding a value added function to said card memory, and (d) linking said value added function to said data element so that said value added function is performed with said data element.

7. The method of claim 6, wherein (a) said entering of said data element comprises entering a plurality of data elements (D1 . . . Dm), in a first elementary file (EF1)

(b) said entering of said value added function comprising entering a plurality of value added functions (F1 . . . Fn) in a second elementary file (EF2), and (c) said linking step comprising transferring one of said data elements (Di) and one of said value added functions (Fj) to a third repository EF3, and (d) said operating system accessing said third repository EF3 and skipping said data element (Di) in said first elementary file (EF1).

8. A smart card comprising (a) a plurality of data elements in memory, (b) a plurality of functions in memory, (c) means for assigning one of said data elements as active, (d) means for associating one of said functions with said active data element, so that said one function is seamlessly executed with active data element when said active data element is accessed, (e) operating system means, in response to an external signal coming from outside said card to execute said one of said elements, for commanding and execution of said active data element, and (f) means for receiving an external signal from outside the card to execute said one data element.

9. The card of claim 8, wherein (a) said active data elements are in a first elementary file, (b) said functions are in a second elementary file, (c) said means for assigning comprises copying one of said data elements from said first elementary file to a third elementary file, (d) said means for associating comprising copying said one function to said third elementary file and attaching said copied function to said copied active data element so that the programs in said element and function are executed seamlessly, and (e) said operating system means commanding for going to said third elementary file for access to said active data element and said attached one function.

10. A card according to claim 9, wherein said operating system means in response to said external signal to execute one of said data elements causes execution of said one data element and said one function by going to said third elementary file and by-passing said first and second elementary files, and further comprising means for storage of a result of said seamlessly executed functions in said card.

11. The card of claim 8, wherein a plurality of said data elements are each a different application for the card;

a plurality of said functions are each a different value added function, one of said plurality of said functions being associated with each of said plurality of data elements, and said means for receiving, comprises means for transmitting to the operating system signals for initiating each of said plurality of applications.

12. The card of card 9, further comprising means for associating another of said data elements with said active data element in said third elementary file for causing said other data element to be executed with said one data element and said one function in said elementary file.

13. The card of claim 8, wherein said memory comprise non-volatile programmable memory, and at least one of said functions being entered into said non-volatile, programmable memory by said means for receiving a signal.

* * * * *